US007889335B2

(12) United States Patent
Durst et al.

(10) Patent No.: US 7,889,335 B2
(45) Date of Patent: Feb. 15, 2011

(54) HANDHELD SPECTROMETER INCLUDING WIRELESS CAPABILITIES

(75) Inventors: Roger David Durst, Middleton, WI (US); John Hooper Landefeld, Kennewick, WA (US); Jeremy Lea, Congleton (GB); Larry Stephen Price, Richland, WA (US)

(73) Assignee: Bruker Biosciences Corporation, Billerica, MA (US)

( * ) Notice: Subject to any disclaimer, the term of this patent is extended or adjusted under 35 U.S.C. 154(b) by 78 days.

(21) Appl. No.: 12/175,176

(22) Filed: Jul. 17, 2008

(65) Prior Publication Data

US 2009/0195776 A1  Aug. 6, 2009

Related U.S. Application Data

(60) Provisional application No. 60/950,370, filed on Jul. 18, 2007.

(51) Int. Cl.
*G01J 3/28* (2006.01)
(52) U.S. Cl. .......................... 356/326; 378/102; 378/44
(58) Field of Classification Search ................. 356/326, 356/417, 451; 702/30; 378/44, 102
See application file for complete search history.

(56) References Cited

U.S. PATENT DOCUMENTS

| 6,031,233 | A  | 2/2000  | Levin et al. |
| 6,038,287 | A  | 3/2000  | Miles |
| 6,226,349 | B1 | 5/2001  | Schuster et al. |
| 6,233,307 | B1 | 5/2001  | Golenhofen |
| 6,426,993 | B1 | 7/2002  | Satoh |
| 6,442,236 | B1 | 8/2002  | Utaka |
| 6,459,767 | B1 | 10/2002 | Boyer |
| 6,661,876 | B2 | 12/2003 | Turner et al. |
| 6,751,576 | B2 | 6/2004  | Hall et al. |
| 6,801,595 | B2 | 10/2004 | Grodzins et al. |
| 6,845,326 | B1 | 1/2005  | Panigrahi et al. |
| 6,885,726 | B2 | 4/2005  | Uehara et al. |
| 6,937,691 | B2 | 8/2005  | Yamagami et al. |
| 7,009,181 | B1 | 3/2006  | Miller et al. |
| 7,106,826 | B2 | 9/2006  | Poteet et al. |
| 2002/0107140 | A1* | 8/2002 | Hampden-Smith et al. .. 502/185 |
| 2003/0048877 | A1 | 3/2003 | Price et al. |
| 2004/0019462 | A1 | 1/2004 | Gehrlein et al. |
| 2005/0023479 | A1 | 2/2005 | Grodzins |
| 2005/0043894 | A1 | 2/2005 | Fernandez et al. |

(Continued)

FOREIGN PATENT DOCUMENTS

WO  2005001431 A2  1/2005

*Primary Examiner*—Gregory J Toatley
*Assistant Examiner*—Abdullahi Nur
(74) *Attorney, Agent, or Firm*—Armstrong Teasdale LLP

(57) ABSTRACT

A method for collecting and analyzing spectrum data to identify a composition of a sample material is described. The method includes obtaining a sample material, receiving a geographical location of the sample material at a handheld instrument, and analyzing the sample material to obtain sample spectrum data using the handheld instrument. The method also includes determining whether to perform an analysis of the sample spectrum data using the handheld instrument, or to perform the analysis of the sample spectrum data using a remote computer. The method also includes determining a composition of the sample material based on an analysis of the sample spectrum data and recording in a memory area at least one of the composition and the geographical location of the sample material.

28 Claims, 7 Drawing Sheets

U.S. PATENT DOCUMENTS

| | | |
|---|---|---|
| 2005/0154277 A1 | 7/2005 | Tang et al. |
| 2005/0253061 A1 | 11/2005 | Cameron et al. |
| 2006/0098779 A1 | 5/2006 | Turner |
| 2006/0146315 A1 | 7/2006 | Treado |
| 2006/0153332 A1 | 7/2006 | Kohno et al. |
| 2006/0279732 A1* | 12/2006 | Wang et al. .................. 356/326 |
| 2006/0291619 A1 | 12/2006 | Statham |
| 2007/0216898 A1 | 9/2007 | Gardner |
| 2008/0159605 A1* | 7/2008 | Ramsay et al. .............. 382/128 |

* cited by examiner

HANDHELD SPECTROMETER INCLUDING WIRELESS CAPABILITIES

CROSS REFERENCE TO RELATED APPLICATIONS

This application claims the benefit of U.S. Provisional Patent Application Ser. No. 60/950,370, filed on Jul. 18, 2007 titled Handheld Spectrometer Including Wireless Capabilities.

BACKGROUND OF THE INVENTION

The field of the disclosure relates generally to analyzing a substance and, more specifically, to performing an analysis of a substance using a handheld spectrometer.

At least some known handheld spectrometers, also referred to as analyzers, have been used in a number of applications including metal identification for sorting, detection and identification of hazardous materials or explosives, detection and identification of environmental pollutants, mining, and identification of lead in paint.

At least some known handheld spectrometers have been used to examine the composition of a sample material. Examples of specific handheld spectrometers include X-ray fluorescence (XRF) spectrometers and ion mobility spectrometers (IMS). XRF spectrometers detect secondary radiation emitted from a sample of material that has been excited by radiation applied to the sample material by the spectrometer. A wavelength distribution of the emitted radiation is characteristic of the elements present in the sample, while the intensity distribution gives information about the relative abundance of the elements in the sample. By means of a spectrum obtained in this manner, an expert typically is able to determine the components and quantitative proportions of the examined test sample.

An IMS analyzes ion mobility to determine the composition of a sample material, which potentially may be a hazardous material. Ion mobility analysis measures the movement of ionized sample molecules in a uniform electric field through a given atmosphere. Once a spectrum is obtained corresponding to the measured ion mobilities, a composition of the sample material can be determined.

There are at least two methods of analyzing a spectrum to determine the elemental composition of the sample material by means of XRF. For example, the methods include: a fundamental parameter analysis and a standards-based analysis. Typically, a spectrometer is calibrated before performing a standards-based analysis, however, the necessary calibrations are not always available for every sample of interest. Preexisting calibrations are not required to perform a fundamental parameter analysis. However, the standards-based analysis is typically less computationally demanding than fundamental parameter analysis. For example, full-fitting spectral analysis peak to background ratios and a detailed model of the fluorescence process are much more computational demanding than standards-based analysis. For this reason, standards-based analysis can be completed using a less powerful processor, or more quickly on a given processor than fundamental parameter analysis on a similar processor.

The elemental composition of a sample material may be used to determine a final analytical result of the material being tested. A final analytical result can include the identity or properties of the sample in question, such as the type of metal alloy. A final analytical result can also include identifying the presence of a contaminant, for example, identifying the presence of lead in a sample of paint. Typically, this final analytical result would be recorded in a log along with other pertinent information, for example, the geographical location of the sample corresponding to the analytical result.

As stated above, an exemplary use of handheld spectrometers is detection and identification of hazardous materials. Mapping of a site for potential contamination includes testing the soil in a particular location by acquiring an elemental spectrum of the soil, analyzing the spectrum to determine the composition of that sample, and recording the results of the test. Currently, the combined time required to analyze the spectrum and record the results can often exceed the time required to acquire the spectrum and can therefore limit the productivity of an operator in the field. It would therefore be desirable to reduce the time required for computationally intensive analysis and recording.

BRIEF DESCRIPTION OF THE INVENTION

In one aspect, a method for collecting and analyzing spectrum data to identify a composition of a sample material is provided. The method includes obtaining a sample material, receiving a geographical location of the sample material at a handheld instrument, and analyzing the sample material to obtain sample spectrum data using the handheld instrument. The method also includes determining whether to perform an analysis of the sample spectrum data using the handheld instrument, or to perform the analysis of the sample spectrum data using a remote computer. The method also includes determining a composition of the sample material based on an analysis of the sample spectrum data and recording in a memory area at least one of the composition and the geographical location of the sample material.

In another aspect, a system for collecting and analyzing spectrum data used to identify a composition of a sample material is provided. The system includes at least one handheld instrument. The at least one handheld instrument includes a processor, a spectrometer, an input device, and wireless communication capabilities. The at least one handheld instrument is configured to receive a geographical location of the sample material, analyze the sample material to obtain sample spectrum data, and process the spectrum data. The system also includes a computer located remotely from the at least one handheld instrument. The computer is communicatively coupled to the at least one handheld instrument.

In yet another aspect, a handheld instrument for collecting and analyzing spectrum data to identify a composition of a sample material is provided. The handheld instrument includes a processor, a spectrometer coupled to the processor, and at least one wireless transmitter/receiver coupled to the processor. The spectrometer is configured to collect the spectrum data from the sample material. The at least one transmitter/receiver is configured to at least one of: transmit data to at least one remote computer, and receive data from the at least one remote computer.

DETAILED DESCRIPTION OF THE INVENTION

Figure 1:
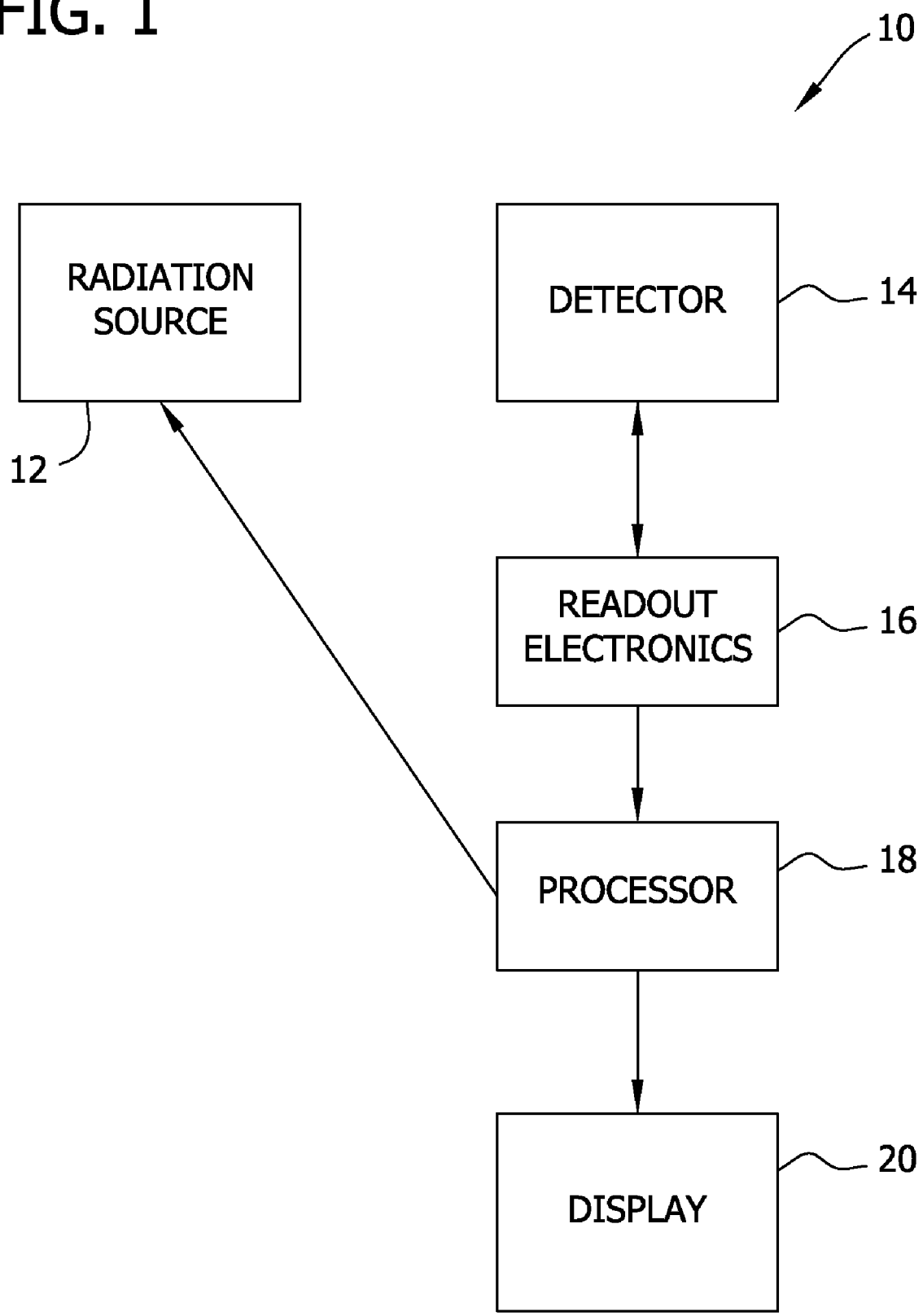
FIG. 1 is a functional block diagram of a known handheld spectrometer.

FIG. 1 is a functional block diagram of a typical handheld spectrometer 10. Spectrometer 10 includes a radiation source 12, a detector 14, readout electronics 16, a processor 18, and a display 20. Radiation source 12 projects a primary beam of radiation toward a sample material that is selected to be analyzed. The sample material becomes excited after being exposed to the primary beam of radiation. This excitation causes the sample to emit a secondary (i.e., characteristic or fluorescent) radiation.

Detector 14 collects the secondary radiation and converts the collected secondary radiation to a detector signal, for example, a voltage signal or an electronic signal. Detector 14 provides the detector signal to readout electronics 16, which determine an energy spectrum of the collected secondary radiation. Readout electronics 16 provide this energy spectrum to a processor 18. Processor 18 determines the unique elemental composition of the sample. A display 20 allows an operator to view results provided to display 20 by processor 18, for example, an operator may view the energy spectrum or a derived elemental composition and a final analytical result, such as an alloy identification of the sample material. Display 20 may be built into the handheld enclosure or it may be in the form of a small hand held computer or personal digital assistant (PDA) that is communicatively coupled to processor 18.

Figure 2:
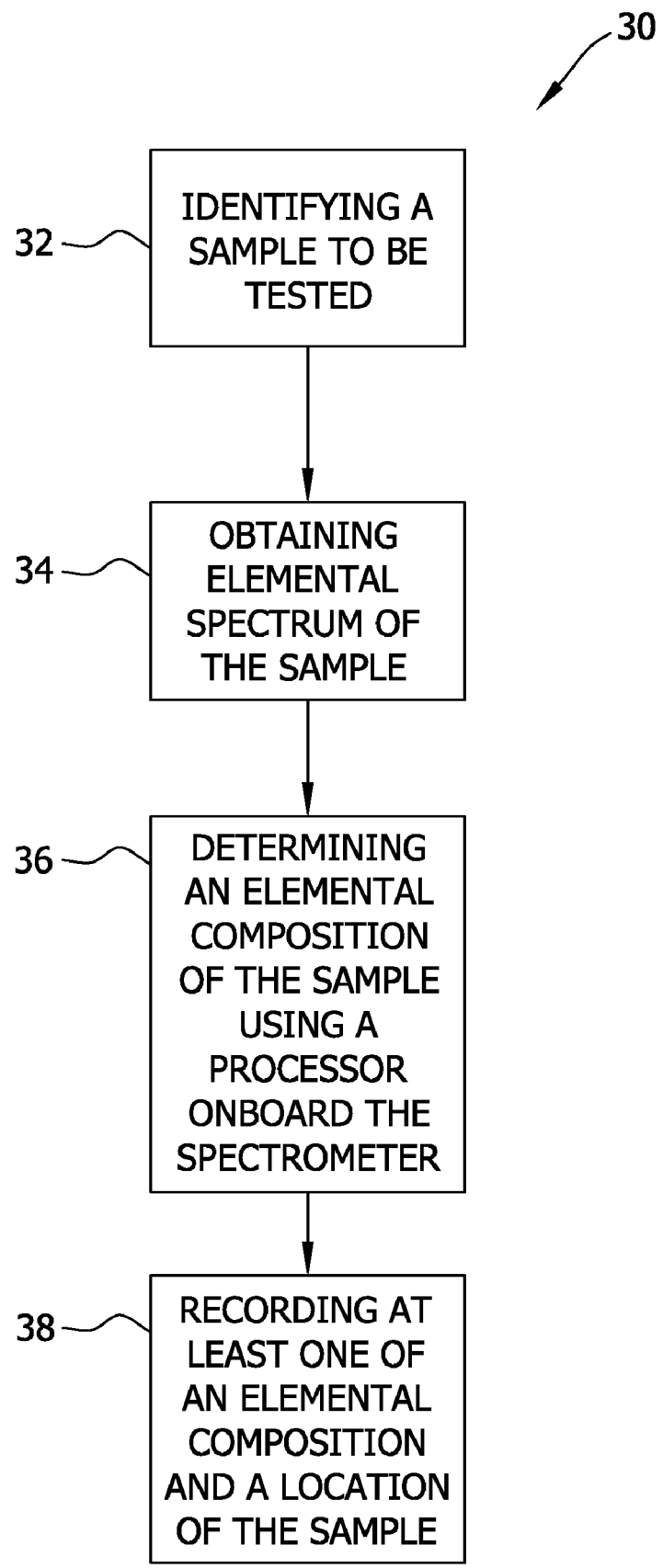
FIG. 2 is a block diagram of a known method of collecting, analyzing, and recording data using a handheld spectrometer.

FIG. 2 is a block diagram of a known method 30 of collecting, analyzing, and recording data using handheld spectrometer 10 of FIG. 1. Method 30 includes an operator of the handheld spectrometer identifying 32 a sample to be analyzed, typically for the purpose of determining an elemental composition of the sample. Method 30 also includes obtaining 34 an elemental spectrum of the sample using the handheld spectrometer. Method 30 further includes determining 36 an elemental composition of the sample from the elemental spectrum using a processor onboard the handheld spectrometer. Finally, method 30 typically includes the operator manually recording 38 the results including the elemental composition and the location of the sample, for example, either in a hardcopy log or on a digital recording medium.

In certain situations where performing method 30 with handheld spectrometer 10, it takes more time for the spectrometer 10 to determine the composition by analyzing the spectrum and for an operator to manually log the analytical result than to acquire the spectrum of the sample of interest. This is especially true if the sample composition is determined by calibration-less, fundamental parameter algorithms, which typically require more calculations than standards-based analysis. Furthermore, with method 30, additional time is then required to transfer the results to a central database.

If the field operators are, in addition, mapping the composition of an extended site, the geographical position of the analyzed sample is manually determined and the results of the analysis along with the geographical position of the samples are entered manually into a log. For example, a site can be examined for environmental contamination or to determine the geological makeup of the site for purposes of mineral prospecting. The geographical position where each sample is taken is manually determined, for example, using a map and surveying tools or via a separate, portable GPS unit. The results of the analysis, for example, the presence or absence of contaminants at that position, are entered manually into a log containing the geographical coordinates together with the elemental composition of the sample.

Furthermore, manually determining a position using separate surveying and/or navigational tools typically requires full use of the operator's hands. Typically, this necessitates the handheld spectrometer being stowed between measurements. Alternating between the handheld spectrometer and the position determination instruments further impairs the operator's efficiency and can also contribute to operator fatigue and errors.

Figure 3:
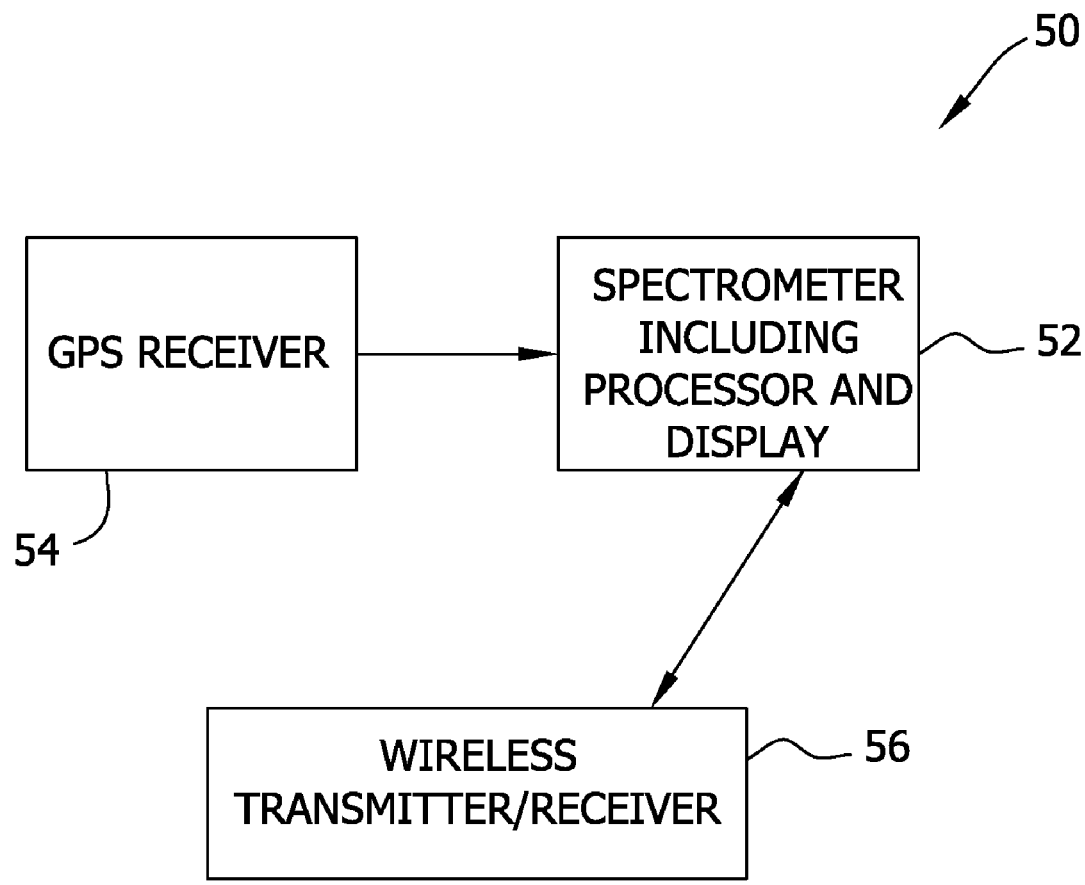
FIG. 3 is a functional block diagram of a handheld analytical instrument in accordance with one embodiment of the present invention.

FIG. 3 is a functional block diagram of a handheld analytical instrument 50 in accordance with one embodiment of the present invention. Handheld analytical instrument 50 includes a spectrometer 52, a position indicating apparatus, which in an exemplary embodiment is a global positioning system (GPS) transponder 54, and a wireless transmitter/receiver 56. In an exemplary embodiment, spectrometer 52 is an XRF spectrometer. In another exemplary embodiment, spectrometer 52 is an IMS. As described above, an XRF spectrometer is used to determine a composition of a sample by analyzing a wavelength distribution spectrum of emitted radiation. An IMS is used to determine a composition of a sample by analyzing a spectrum of ion mobilities of emitted radiation. Spectrometer 52 is described as either an XRF spectrometer or an IMS, however, spectrometer 52 may include any type of detector capable of obtaining spectral data to be used in analysis of a sample's composition.

Figure 4:
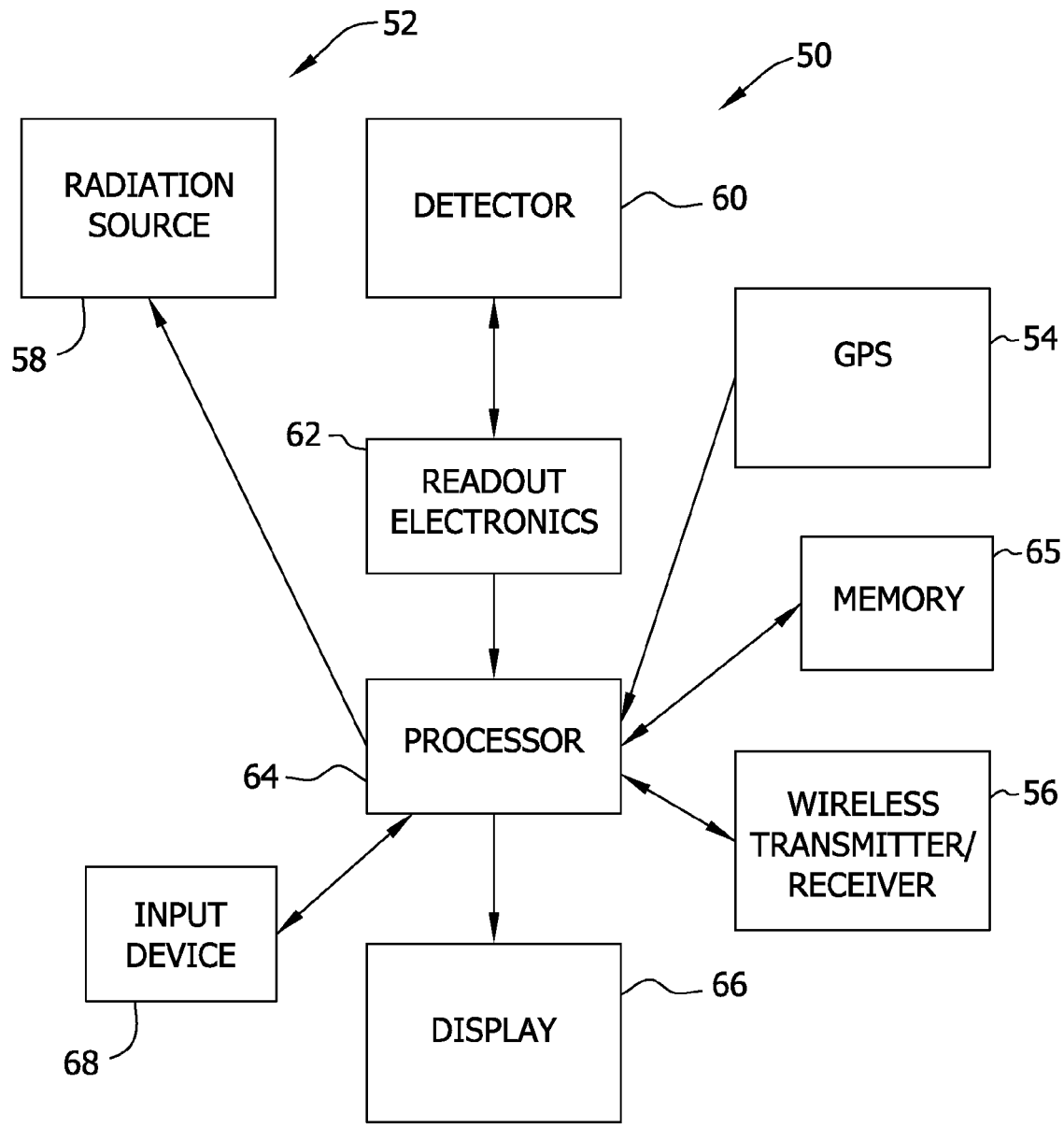
FIG. 4 is a second functional block diagram of the handheld analytical instrument of FIG. 3.

FIG. 4 is a functional block diagram of handheld analytical instrument 50 that, as described above with regard to spectrometer 10, includes a radiation source 58, a detector 60, readout electronics 62, a processor 64, a memory 65, and, in certain embodiments, a display 66. Display 66 includes, but is not limited to, a liquid crystal display (LCD) and a light emitting diode (LED) display for indicating whether or not a predetermined element is present in a predetermined concentration. Display 66 can show, for example, at least one of an X-ray spectrum, a derived elemental composition, and a final analytical result of a sample of material being tested.

In example embodiments, processor 64 may include one or more of a microprocessor, processor, microcontroller, microcomputer, programmable logic controller, application specific integrated circuit, and other programmable circuits. Memory 65 is coupled to processor 64 and facilitates storing data, including, but not limited to, a database of sample material spectrum data, data corresponding to the geographical location of the sample material, and results of a compositional analysis of the sample material.

In the exemplary embodiment, handheld instrument 50 may also include at least one input device 68. Input device 68 may include, but is not limited to, a touch screen, a microphone, a keypad, a dial, and a plurality of switches. However, input device 68 may include any device that allows handheld instrument 50 to function as described herein. Input device 68 facilitates providing handheld instrument 50 with selections or data, and more specifically, facilitates providing processor 64 with selections or data. For example, a user can enter, using input device 68, a selection as to whether to perform a compositional analysis of a captured spectrum of a sample material using processor 64, or rather to transmit the captured spectrum to a remote computer (not shown in FIG. 4). Furthermore, a user can enter into handheld instrument 50, using input device 68, geographical data corresponding to a location of a sample material.

Figure 5:
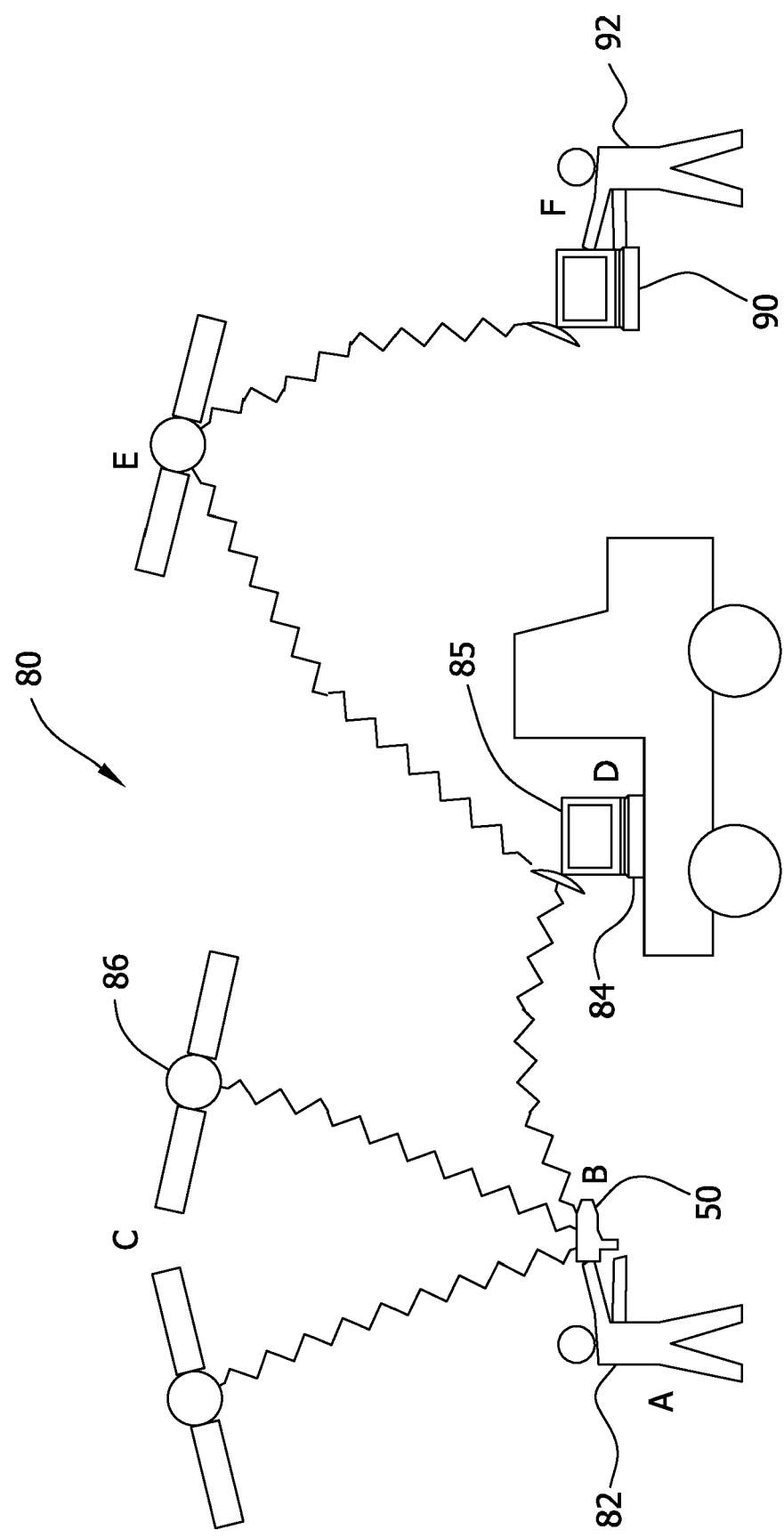
FIG. 5 is a schematic diagram of a system for collecting elemental information using the handheld analytical instrument of FIGS. 3 and 4.

FIG. 5 is a schematic diagram of a system 80 for collecting spectral information using handheld instrument 50. System 80 includes at least one handheld instrument 50, a first remote computer 84, at least one satellite 86, and in certain exemplary embodiments, a second remote computer 90. In example embodiments, remote computer 84 may include one or more of a microprocessor, processor, microcontroller, microcomputer, programmable logic controller, application specific integrated circuit, and other programmable circuits. In another alternative embodiment, remote computer 84 may include one or more of a personal computer, a server, a personal digital assistant, and any other device capable of receiving and processing data from handheld instrument 50. Remote computer 84 may include an output display 85. Output display 85 may be a printer, a screen, or any other device that allows a user to view an output from remote computer 84. Remote computer 84 may also include an input device (not shown in FIG. 5). The input device may include one or more of a keypad, touch screen, jog dial, microphone, and any other input device capable of providing instructions from a user to at least one of remote computer 84 and handheld instrument 50. Remote computer 84 may also include an internal, or externally coupled, memory (not shown in FIG. 5). The memory facilitates storing data, including, but not limited to, a database of sample material spectrum data, data corresponding to the geographical location of the sample material, and results of a compositional analysis of the sample material.

When an operator 82 identifies a location of interest, operator 82 uses handheld instrument 50 to obtain a spectrum of the sample. Depending on the complexity of the sample and the analysis method used to convert the elemental or ion mobility spectrum to a sample composition, the elemental composition may be determined on processor 64 or a local, handheld computer (not shown in FIG. 5).

However, the spectrum may also be transferred wirelessly to remote computer 84 where numerically intensive analysis can be accomplished rapidly due to remote computer 84 not having the size restrictions of processor 64. Remote computer 84 is therefore able to include larger and more powerful components than handheld instrument 50. The wireless transfer of the spectrum allows analysis that may be computationally too expensive to perform on a small portable computer to be accomplished at a site remote from handheld instrument 50. The resulting sample composition is sent back to wireless transmitter/receiver 56 of handheld instrument 50 so that operator 82 can view the results in the field.

In an exemplary embodiment, wireless transmitter/receiver 56 is configured to transmit and receive information over a broadband network. In another exemplary embodiment, wireless transmitter/receiver 56 is configured to transmit and receive information over a cellular connection or via a satellite connection for remote sites. For example, data acquisition in remote areas, which sometimes occurs in the case of mineral prospecting, may consist of positioning remote computer 84 on a vehicle, for example, a truck or a helicopter. In an exemplary embodiment, remote computer 84 includes a broad-band wireless transmitter/receiver that communicates using WiMAX (IEEE 802.16e) or any other wireless communications standard. Remote computer 84 is communicatively coupled to each of a plurality of handheld instruments 50 via bidirectional wireless data links. WiMAX allows remote data transfer and does not require a direct line of sight between remote computer 84 and the plurality of handheld instruments 50. This allows the individual operators freedom and flexibility when mapping extended areas.

In an exemplary embodiment, a supervisor 92, for example, a supervisor who has expert knowledge necessary to analyze results of the sample analysis, is positioned with remote computer 84. In another exemplary embodiment, remote computer 84 is linked to second remote computer 90, located at another site, via a broadband satellite link. This configuration allows expert supervisor 92 to reside nearly anywhere in the world while supervising operations anywhere on the globe.

Expert knowledge is useful to understand the significance of the data collected and to guide further data collection. For example, if operator 82 is surveying a site for potential mineral extraction, operator 82 may need expert geological knowledge to recognize the significance of various mineral compositions.

However, scientists with such expert knowledge are typically in limited supply. It would therefore be highly desirable to allow a technician or technicians in the field with limited or no applications expertise to seamlessly share data with an expert scientist or engineer at a remote site. The remote expert can thus guide the data acquisition of one technician or a plurality of technicians in the field, further improving the efficiency of the mapping operation.

Figure 6:
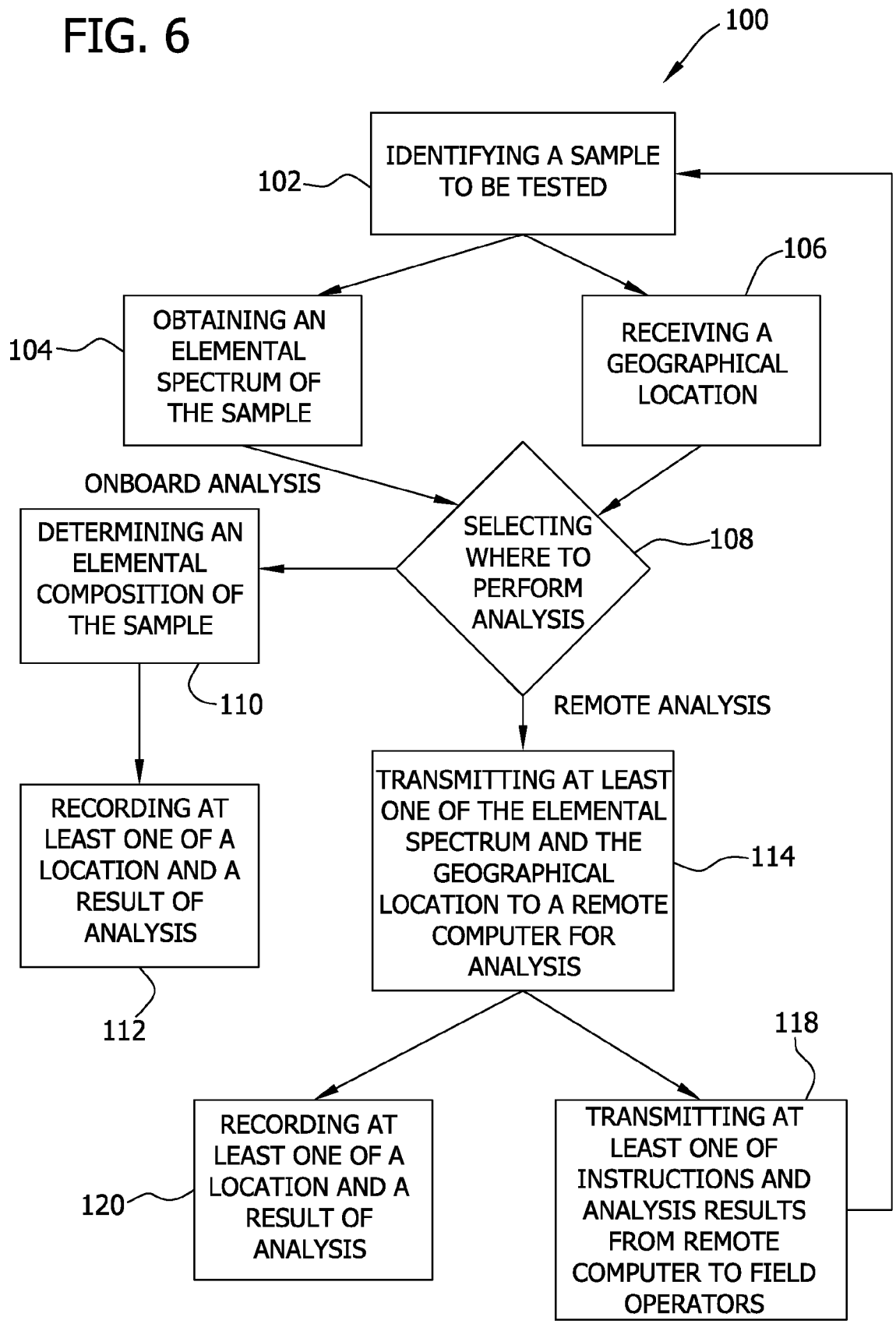
FIG. 6 is a block diagram of a method of collecting, analyzing, and recording data using the handheld analytical instrument of FIGS. 3 and 4.

FIG. 6 is a block diagram of a method 100 of collecting, analyzing, and recording data using at least one handheld analytical instrument 50 of FIGS. 3 and 4. A technical effect is achieved by performing method 100. Method 100 includes identifying 102 at least one of a sample material and a location to be tested. In an exemplary embodiment, operator 82 identifies at least one of a sample material and a location to be tested. In another exemplary embodiment, a supervisor 92 communicates with operator 82 and provides the identity of at least one of a sample material and a location to be tested.

Method 100 also includes operator 82 obtaining 104 a sample spectrum from the identified sample or location using handheld instrument 50, and receiving 106 coordinates of the geographical location. In the exemplary embodiment, GPS transponder 54 within handheld instrument 50 receives geographical coordinates from satellite 86. Having GPS transponder 54 in handheld instrument 50 allows the precise geographical position of the sample location to be determined. Integrating GPS transponder 54 saves time and effort as operator 82 does not have to use separate navigation or surveying tools to determine a location of a sample. In addition, it allows several operators to efficiently coordinate the mapping of an extended site, this coordination potentially occurring under the supervision of a remote supervisor, as described above. Furthermore, the precise mapping of measurement locations allows subsequent re-testing of the composition at any specific location at a later time.

In an alternative embodiment, receiving 106 coordinates of the geographical location includes a user entering geographical data corresponding to the location of the sample material into handheld instrument 50 using input device 68 (shown in FIG. 4). Entering geographical data into handheld instrument 50 facilitates a consolidation of geographical data and sample spectrum data. Handheld instrument 50 receives both the geographical data and the sample spectrum data, which facilitates maintaining the relationships between both types of data for each sample material.

Method 100 further includes selecting 108 where to perform the analysis of the acquired spectrum. Selecting 108 where to perform the analysis includes choosing whether to have the processor onboard the handheld instrument perform the calculations necessary to analyze the sample spectrum, or have a remote computer perform the calculations. In an exemplary embodiment, operator 82 selects where to perform the analysis by entering a selection into handheld instrument 50 using input device 68 (shown in FIG. 4). In another exemplary embodiment, handheld instrument 50 is configured to determine where to perform the analysis. Factors that are considered when making this determination include, for example, whether fundamental parameter analysis or standards-based analysis is being used, the power of the handheld instrument's onboard processor, and the complexity of the calculations necessary to convert the detected spectrum to the desired results.

Once selecting 108 to perform the analysis using the processor onboard the handheld instrument, method 100 further includes determining 110 a composition of the sample from the sample spectrum using a processor onboard handheld instrument 50. As described above with respect to FIG. 3, method 100 also includes the operator manually recording 112 the results including the sample composition and the location of the sample, for example, either in a hardcopy log or on a digital recording medium.

Once selecting 108 to perform the analysis using a remote computer, method 100 includes transmitting 114 at least one of the sample spectrum and the geographical location from a handheld instrument to a remote computer for analysis. In an exemplary embodiment, transmitting 114 is completed using a wireless transmitter/receiver as described above. The wireless architecture allows several handheld instruments in the field to report data to a single remote computer or a plurality of remote computers. This allows a supervisor with expert application knowledge to examine the data collected by a number of technicians in the field that may have little or no expert applications knowledge.

The remote computer can also simultaneously collect data from several operators and analyze the sample spectra sent from each. Method 100 also includes transmitting 118 at least one of instructions and analysis results from the remote computer to at least one field operator, and recording 120 at least one of a location and a result of analysis completed by the remote computer.

Transmitting 118 at least one of instructions and analysis results includes a remote expert (either co-located with the vehicle mounted computer, or in another remote location) sharing the data received from handheld instrument 50 with other handheld instruments in the field and communicating with the operator or operators in the field in real time to direct the data acquisition process. The wireless communication allows all of the field operators to be directed by a remote supervisor.

Recording 120 at least one of a location and a result of analysis includes logging at least one of a location and corresponding analytical results to a database on the remote server. In an exemplary embodiment, the operator can log the data with, for example, a keystroke or via a voice-activated command, so that the handheld instrument need not be unlimbered and stowed between measurements.

An exemplary use of the handheld instrument described above is to test and map houses or apartments in a neighborhood for the presence of lead in paint. In this exemplary embodiment, a central truck mounted remote computer with a wide-area wireless capability would be in realtime contact with at least one handheld instrument. Sample spectra, along with the locations of the samples corresponding to the sample spectra, obtained using handheld instruments would be transmitted to the remote computer and analyzed, results recorded, and mapped. At least one of an instruction and analysis results would be transmitted from the remote computer to the at least one handheld instrument.

Having a central remote computer allows multiple operators to use independent handheld instruments to map multiple locations within a site. The two-way communication between the central remote computer and each handheld instrument enables coordination of the multiple operators.

Figure 7:
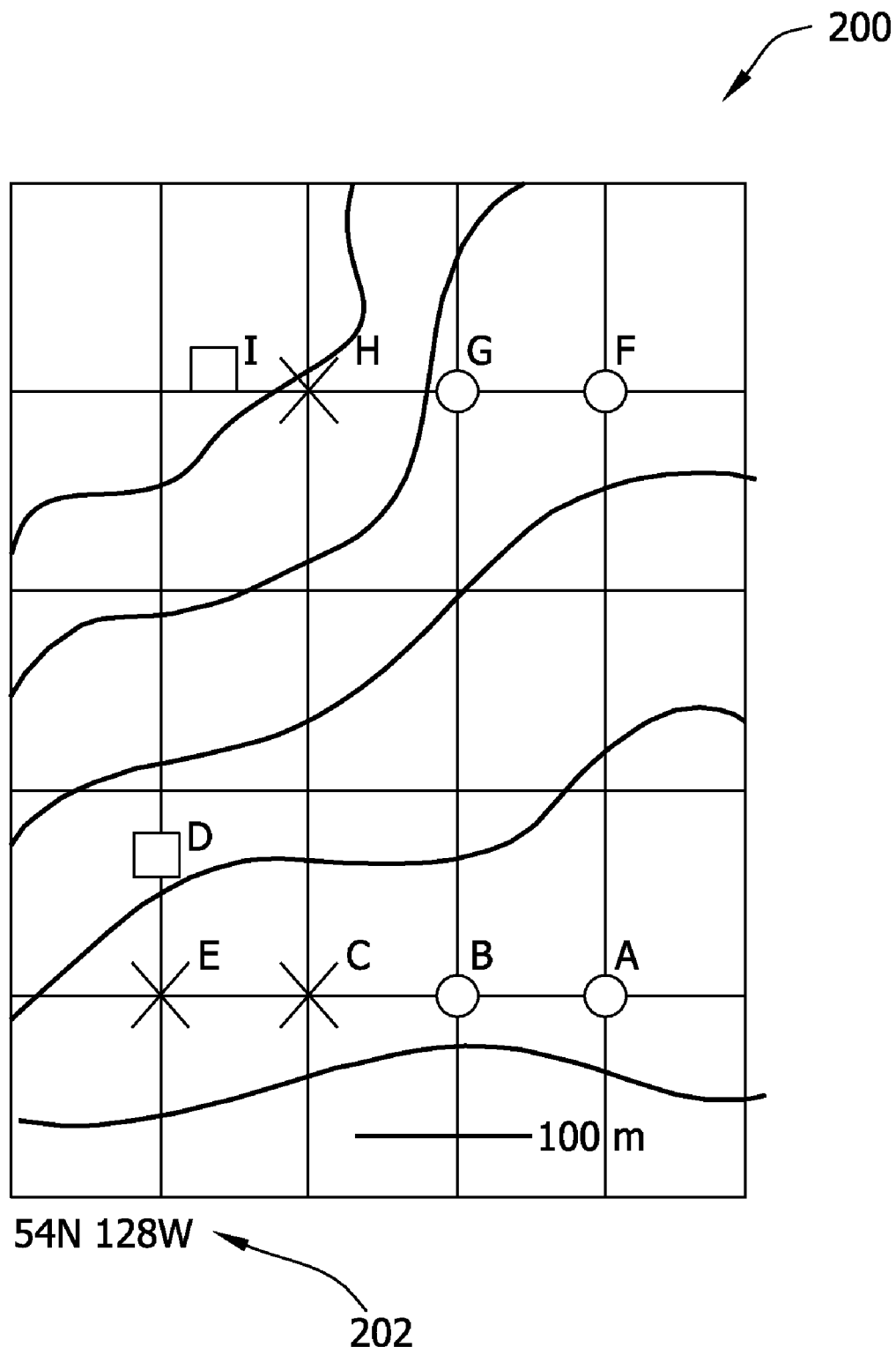
FIG. 7 is an exemplary screen shot from a display of the handheld analytical instrument of FIGS. 3 and 4.

FIG. 7 is an exemplary screen shot 200 from a display of the handheld analytical instrument of FIGS. 3 and 4. Screen shot 200 is an example of a location map displayed on display 66 of handheld instrument 52 of FIGS. 3 and 4. Screen shot 200 includes indications (A, B, C, D, E, F, G, H, and I) of the positions where measurements have been taken. Symbols corresponding to analytical results (e.g., whether or not a contaminant was found) are also included. The present position of the operator is indicated in coordinate form 202, as well as, in certain embodiments, the position of a second operator (not shown in FIG. 7) and the results of both operators' measurements. A remote supervisor can use this geographical information to direct the ongoing exploration in real time. In addition, this precise geographical data can later be used to make follow-up measurements at the same site.

The addition of geographical location capability based on GPS technology allows system 80 (see FIG. 5) to automatically log data and analytical results together with geographical information. This makes analysis more efficient and especially allows efficient, precise mapping of large geographical areas for use in, for example, remediation of soil contamination, lead in paint, geological or archeological site surveys, or rapid inventory of metals in warehouses or scrap yards.

In addition, data collected and only stored on the handheld instrument is at risk of being lost due to corrupted files, instrument damage, theft of the instrument, or instrument malfunctions in operation.

Therefore system 80, as described above, employs integral wide-area wireless capability together with integrated GPS location determination capability to ease the tasks of data logging and position determination. This can increase the efficiency of the operator and lessens operator fatigue. As noted above, these capabilities can also allow an expert supervisor at a remote site to analyze the incoming data in real time and to direct the exploration process.

The wireless capability allows the operator to transfer data to a remote computer for data logging and analysis. Given that the remote computer can have many times the processing power of the handheld instrument, this can significantly decrease the analysis time and thus allow more efficient data collection. In addition, the wireless capability allows an expert at the remote site to examine data from the field to supervise data collection strategies. Finally, the wireless capability allows the operator to transfer the results to a central database at the touch of a button (or via a voice-activated command). This also significantly reduces the time and effort involved in data logging.

Built-in GPS location determination capability allows the operator to automatically log the precise geographical position onto the remote computer together with the sample analysis from that position. The GPS location capability also allows the operator to easily and efficiently log the position of sample measurements and also allows a remote supervisor to instruct operators as to the locations of desired samples.

By seamlessly integrating wireless data communications and GPS location identification with a spectrometer, the data acquisition and mapping processes are simplified. This simplification increases the efficiency of field operators.

While the invention has been described in terms of various specific embodiments, those skilled in the art will recognize that the invention can be practiced with modification within the spirit and scope of the claims.

What is claimed is:

1. A method for collecting and analyzing energy spectrum data to identify a composition of a sample material, said method comprising:
receiving geographical location information, at a handheld instrument, corresponding to a location of the sample material;
obtaining sample energy spectrum data by projecting a primary beam of radiation from an X-ray source included within the handheld instrument toward the sample material, collecting secondary radiation emitted from the sample material, and generating the sample energy spectrum data based on the collected secondary radiation;
performing an analysis of the sample energy spectrum data;
determining a composition of the sample material based on the analysis of the sample energy spectrum data; and
recording in an electronic memory area at least one of the composition of the sample material and the geographical location information corresponding to the location of the sample material.

2. A method in accordance with claim 1 wherein receiving the geographical location information comprises at least one of entering geographical information into the handheld instrument and receiving geographical information at a global positioning system (GPS) receiver coupled to the handheld instrument.

3. A method in accordance with claim 1 further comprising determining whether to perform the analysis of the sample energy spectrum data using the handheld instrument or using a remote computer based on a user input.

4. A method in accordance with claim 1 further comprising determining, using the handheld instrument, whether to perform the analysis of the sample material using the handheld instrument or using the remote computer based on at least one of a type of analysis to be performed on the sample material and a complexity of calculations necessary to determine the composition of the sample material from the sample energy spectrum data.

5. A method in accordance with claim 1 further comprising transmitting at least one of the sample energy spectrum data and the geographical location information from the handheld instrument to the remote computer for analysis at a remote location.

6. A method in accordance with claim 1 further comprising transmitting at least one of instructions for a user of the handheld instrument and analysis results from the remote computer to the handheld instrument.

7. A method in accordance with claim 1 wherein recording in the electronic memory area further comprises at least one of: recording data representing the composition and the geographical location information of the sample material in a memory area included within the handheld instrument, and transmitting data representing the composition and the geographical location information of the sample material from the handheld instrument to a database at a remote location.

8. A system for collecting and analyzing energy spectrum data used to identify a composition of a sample material, said system comprising:

at least one handheld instrument comprising a processor, an X-ray source, a detector, an input device, and a wireless transmitter, said at least one handheld instrument configured to:
receive geographical location information corresponding to a location of said at least one handheld instrument,
obtain sample energy spectrum data associated with the sample material by projecting a primary beam of radiation from said X-ray source toward the sample material, collecting secondary radiation emitted from the sample material, and generating the sample energy spectrum data based on the collected secondary radiation, and
process the sample energy spectrum data; and
a computer located remotely from said at least one handheld instrument, said computer communicatively coupled to said at least one handheld instrument.

9. A system in accordance with claim 8 wherein said at least one handheld instrument is further configured to determine at least one of:
whether to perform a compositional analysis using said at least one handheld instrument or using said remote computer, and
a composition of the sample material based on a compositional analysis of the sample energy spectrum data.

10. A system in accordance with claim 9 wherein said at least one handheld instrument is further configured to determine whether to perform the compositional analysis of the sample material using said handheld instrument or to perform the compositional analysis of the sample material using said remote computer, based on one or more of: a type of analysis to be performed and a complexity of the calculations necessary to determine the composition of the sample material from the sample energy spectrum data.

11. A system in accordance with claim 8 wherein said input device facilitates a user inputting a selection of whether to perform a compositional analysis of the sample material using said at least one handheld instrument or to perform the compositional analysis of the sample material using said remote computer.

12. A system in accordance with claim 8 wherein said input device comprises at least one of a touch screen, a microphone, a keypad, a dial, a plurality of switches, and a global positioning system (GPS) receiver.

13. A system in accordance with claim 12 wherein said GPS receiver is configured to receive the geographical location information.

14. A system in accordance with claim 8 wherein said input device facilitates a user inputting the geographical location information into said at least one handheld instrument.

15. A system in accordance with claim 8 wherein said at least one handheld instrument is configured to transmit at least one of the sample energy spectrum data and the geographical location information to said remote computer.

16. A system in accordance with claim 8 wherein said remote computer is configured to perform a compositional analysis of the sample material based on the sample energy spectrum data.

17. A system in accordance with claim 16 wherein said handheld instrument further comprises a wireless receiver, said remote computer further configured to transmit at least one of a user instruction and data representing compositional analysis results to said wireless receiver.

18. A system in accordance with claim 17 wherein said handheld instrument further comprises a display device configured to display at least one of the geographical information, the sample energy spectrum, the compositional analysis results, and the user instruction.

19. A system in accordance with claim 8 wherein said handheld instrument further comprises an electronic memory area, said memory area configured to store at least one of data representing compositional analysis results and the geographical location information.

20. A handheld instrument for collecting and analyzing energy spectrum data to identify a composition of a sample material, said handheld instrument comprising: a spectrometer comprising an X-ray source positioned partially at least within said handheld instrument, a detector, and at least one processor, said spectrometer configured to obtain the energy spectrum data from the sample material; a global positioning system (GPS) receiver coupled to said spectrometer, said GPS receiver configured to receive geographical information corresponding to a location of the sample material; and a wireless transmitter coupled to said spectrometer, said transmitter configured to transmit data to at least one remote computer.

21. A handheld instrument in accordance with claim 20 wherein said at least one processor is configured to determine whether to perform a compositional analysis of the sample material using said processor or to transmit the energy spectrum data to said at least one remote computer for compositional analysis.

22. A handheld instrument in accordance with claim 21 wherein said at least one processor is configured to determine whether to transmit the energy spectrum data of the sample material to said at least one remote computer, based on one or more of: a type of analysis to be performed and a complexity of the calculations necessary to determine the composition of the sample material from the energy spectrum data.

23. A handheld instrument in accordance with claim 20 further comprising a wireless receiver configured to receive data from said at least one remote computer, wherein at least one of said transmitter and said receiver is configured to transmit/receive at least one of data representing compositional analysis results and data representing an instruction for use by a user of said handheld instrument.

24. A handheld instrument in accordance with claim 23 wherein said instruction for use by the user comprises at least a location of a desired sample material.

25. A handheld instrument for collecting and analyzing spectrum data to identify a composition of a sample material, said handheld instrument comprising: a processor; an X-ray source within said handheld instrument, coupled to said processor, and configured to project a primary beam of radiation toward the sample material; an energy dispersive detector coupled to said processor, said detector configured to collect secondary radiation emitted from the sample material and provide a detector signal to readout electronics which determine an energy dispersive spectrum of the collected secondary radiation; a position indicating apparatus coupled to said processor and configured to provide geographical location information corresponding to a location of the sample material; and a wireless transmitter coupled to said processor, said transmitter configured to transmit data to at least one remote computer, the transmitted data corresponding to at least one of the energy dispersive spectrum and the geographical location of the sample material.

26. A handheld instrument in accordance with claim 25, further comprising a wireless receiver configured to receive data from said at least one remote computer, the received data corresponding to at least one of field operator instructions and analysis results.

27. A handheld instrument in accordance with claim 25 wherein said position indicating apparatus comprises a global positioning system (GPS) receiver configured to receive geographical information corresponding to the location of the sample material.

28. A handheld instrument in accordance with claim 25 wherein said processor is configured to determine whether to perform a compositional analysis of the sample material or to transmit the energy dispersive spectrum data to said at least one remote computer for compositional analysis.

* * * * *